US009306884B2

(12) United States Patent
Traasdahl (10) Patent No.: US 9,306,884 B2
(45) Date of Patent: Apr. 5, 2016

(54) COMPUTER-BASED METHOD AND SYSTEM FOR PROCESSING A FILE REQUEST IN RESPONSE TO A MESSAGE RECEIVED FROM A USER MOBILE DEVICE

(71) Applicant: Clear Channel Management Services, Inc., San Antonio, TX (US)

(72) Inventor: Are Traasdahl, New York, NY (US)

(73) Assignee: IHEARTMEDIA MANAGEMENT SERVICES, INC., San Antonio, TX (US)

(*) Notice: Subject to any disclaimer, the term of this patent is extended or adjusted under 35 U.S.C. 154(b) by 82 days.

(21) Appl. No.: 13/942,849

(22) Filed: Jul. 16, 2013

(65) Prior Publication Data

US 2013/0304728 A1 Nov. 14, 2013

Related U.S. Application Data

(63) Continuation of application No. 12/117,671, filed on May 8, 2008, now Pat. No. 8,565,733.

(51) Int. Cl.
*H04L 12/58* (2006.01)
*G06F 17/30* (2006.01)

(52) U.S. Cl.
CPC .......... *H04L 51/08* (2013.01); *G06F 17/30554* (2013.01); *G06F 17/30864* (2013.01)

(58) Field of Classification Search
CPC .................... G06F 17/30064; G06F 17/30554; H04L 51/08
USPC .................................. 455/414.1–414.3, 466; 707/999.003–999.005, 999.01, 6
See application file for complete search history.

(56) References Cited

U.S. PATENT DOCUMENTS

| | | | |
|---|---|---|---|
| 6,397,246 B1* | 5/2002 | Wolfe | 709/217 |
| 8,266,315 B2 | 9/2012 | van Oldenborgh et al. | |
| 8,316,146 B2 | 11/2012 | Ehn et al. | |
| 2003/0073433 A1* | 4/2003 | Djelogiry | 455/426 |
| 2003/0211845 A1* | 11/2003 | Lohtia et al. | 455/414.3 |
| 2003/0229624 A1* | 12/2003 | Petrisor et al. | 707/3 |
| 2005/0187971 A1* | 8/2005 | Hassan et al. | 707/104.1 |
| 2007/0027857 A1* | 2/2007 | Deng et al. | 707/3 |
| 2007/0105536 A1* | 5/2007 | Tingo, Jr. | 455/414.1 |
| 2007/0288433 A1* | 12/2007 | Gupta et al. | 707/3 |
| 2008/0052370 A1* | 2/2008 | Snyder | 709/217 |
| 2008/0086539 A1* | 4/2008 | Bloebaum et al. | 709/217 |
| 2008/0275864 A1* | 11/2008 | Kim et al. | 707/5 |
| 2009/0006396 A1* | 1/2009 | Dunlap et al. | 707/6 |
| 2009/0144260 A1* | 6/2009 | Bennett et al. | 707/5 |

(Continued)

FOREIGN PATENT DOCUMENTS

WO WO 2007080413 A1 * 7/2007
WO WO2011008188 A1 1/2011

*Primary Examiner* — Nathan Taylor
(74) *Attorney, Agent, or Firm* — Garlick & Markison; Kevin L. Smith (57) ABSTRACT

The invention provides a computer-based method of transmitting a file, including receiving a message from a user mobile device at a service computer system, determining at the server computer system whether the message includes a search identifier, extracting at least one search result from a data store at the server computer system based on a search term in the message if the server computer system determined that the message included a search identifier, and transmitting a file corresponding to the search result from the server computer system to the user mobile device.

20 Claims, 12 Drawing Sheets

(56) References Cited

U.S. PATENT DOCUMENTS

| | | |
|---|---|---|
| 2009/0192887 A1 | 7/2009 | Moore et al. |
| 2009/0193134 A1 | 7/2009 | Moore et al. |
| 2009/0280842 A1* | 11/2009 | Traasdahl ............ 455/466 |
| 2010/0075641 A1* | 3/2010 | Schwartz ............ 455/414.1 |

\* cited by examiner

COMPUTER-BASED METHOD AND SYSTEM FOR PROCESSING A FILE REQUEST IN RESPONSE TO A MESSAGE RECEIVED FROM A USER MOBILE DEVICE

CROSS-REFERENCE TO RELATED APPLICATIONS

This application claims priority pursuant to 35 U.S.C. §120, as a continuation, to the following U.S. Utility Patent Application which is hereby incorporated herein by reference in its entirety and made part of the present U.S. Utility Patent Application for all purposes:

U.S. Utility application Ser. No. 12/117,671, entitled "COMPUTER-BASED METHOD AND SYSTEM FOR PROCESSING A FILE REQUEST IN RESPONSE TO A MESSAGE RECEIVED FROM A USER MOBILE DEVICE," filed May 8, 2008, now issued as U.S. Pat. No. 8,565,733, on Oct. 22, 2013.

BACKGROUND OF THE INVENTION

1). Field of the Invention

This invention relates to a computer-based method and system for manipulating electronic media such as ringtones and videos.

2). Discussion of Related Art

Mobile phones usually have a number of ringtones that are installed by a manufacturer. A user can select a ringtone from a drop-down list, and it is also sometimes possible to associate different ringtones with different incoming phone numbers.

A user may wish to download a ringtone from a remote server and store the ringtone in memory of the mobile phone. However, a mobile phone and the network that it is connected to are usually too slow and the viewing capabilities on the mobile phone are too limited for finding media on a remote server. A company that provides mobile media content for use on mobile phones will usually also have a website that is accessible from a user computer system over the Internet. The user of the mobile phone may make use of the user computer system to find listings of mobile content on the website through browsing or searching functionality built into the website, and then instruct the website to facilitate downloading of the media content to the mobile phone. A message may, for example, be sent to the mobile phone, and the message can include a link to the media content on the server.

BRIEF DESCRIPTION OF THE DRAWINGS

The invention is further described by way of example with reference to the accompanying drawings, wherein.

DETAILED DESCRIPTION OF THE INVENTION

Figure 1:
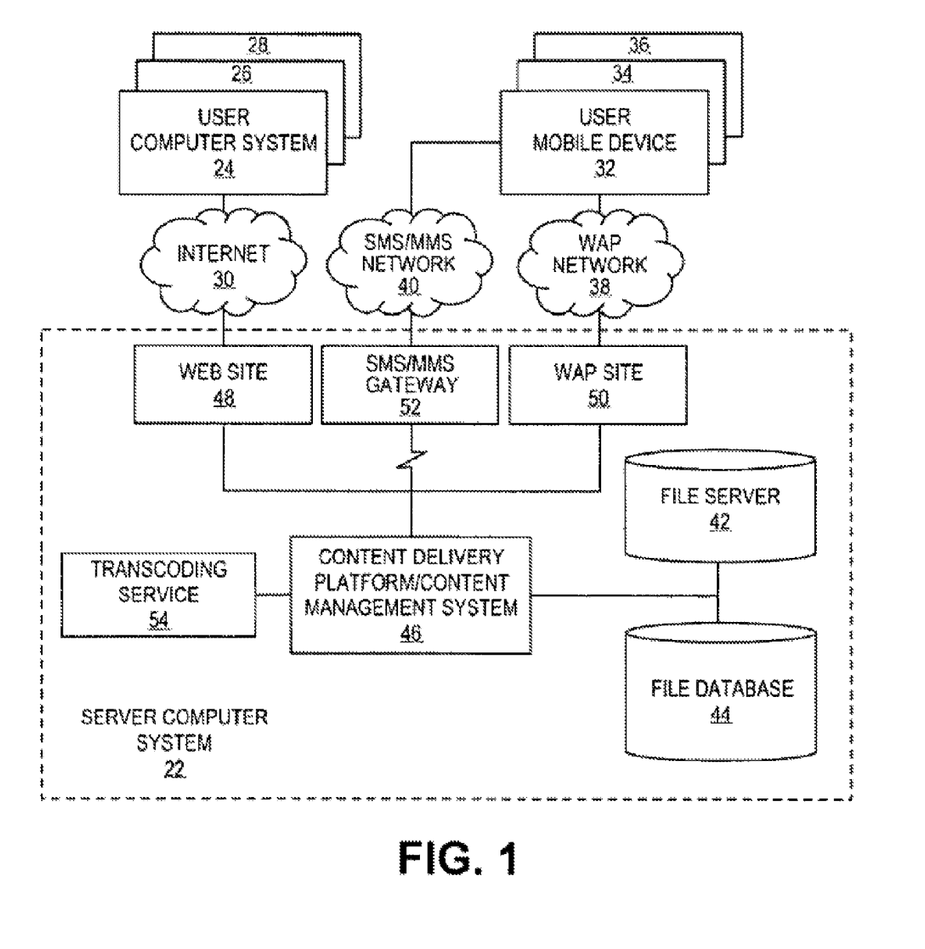
FIG. 1 is a block diagram of a network system in which aspects of the invention are manifested.

FIG. 1 of the accompanying drawings illustrates a network system 20 that embodies features of the invention. The network system 20 includes a server computer system 22, a plurality of user computer systems 24, 26, and 28 that are connected to the server computer system 22 over a network in the form of the Internet 30, and a plurality of user mobile devices 32, 34, and 36 that are connected over a Wide Application Protocol (WAP) network 38 and over a Short Message Service (SMS) and Multimedia Messaging Service (MMS) network 40 to the server computer system 22.

The server computer system 22 includes a file store in the form of a file server 42, a data store in the form of a file database 44, a content delivery platform and content management system 46, a Web site 48, a WAP site 50, an SMS/MMS gateway 52, and a transcoding service 54. The file database 44 is connected to the file server 42. The content delivery platform and content management system 46 forms the center of the server computer system 22, and all other components including the Web site 48, WAP site 50, SMS/MMS gateway 52, transcoding service 54, file server 42, and file database 44 are directly connected to the content delivery platform and content management system 46. The content delivery platform and content management system 46 indexes files such as ringtones (reduced media content), full-track content, games, wallpaper, and graphics from the file server 42 into the file database 44 and in a structured manner, as will be required for downloading and for the Web site 48, WAP 50, SMS/MMS gateway 52, and transcoding service 54. The transcoding service 54 prepares communications suitable for transmission over the Internet 30, WAP network 38, and SMS/MMS network 40.

Figure 2:
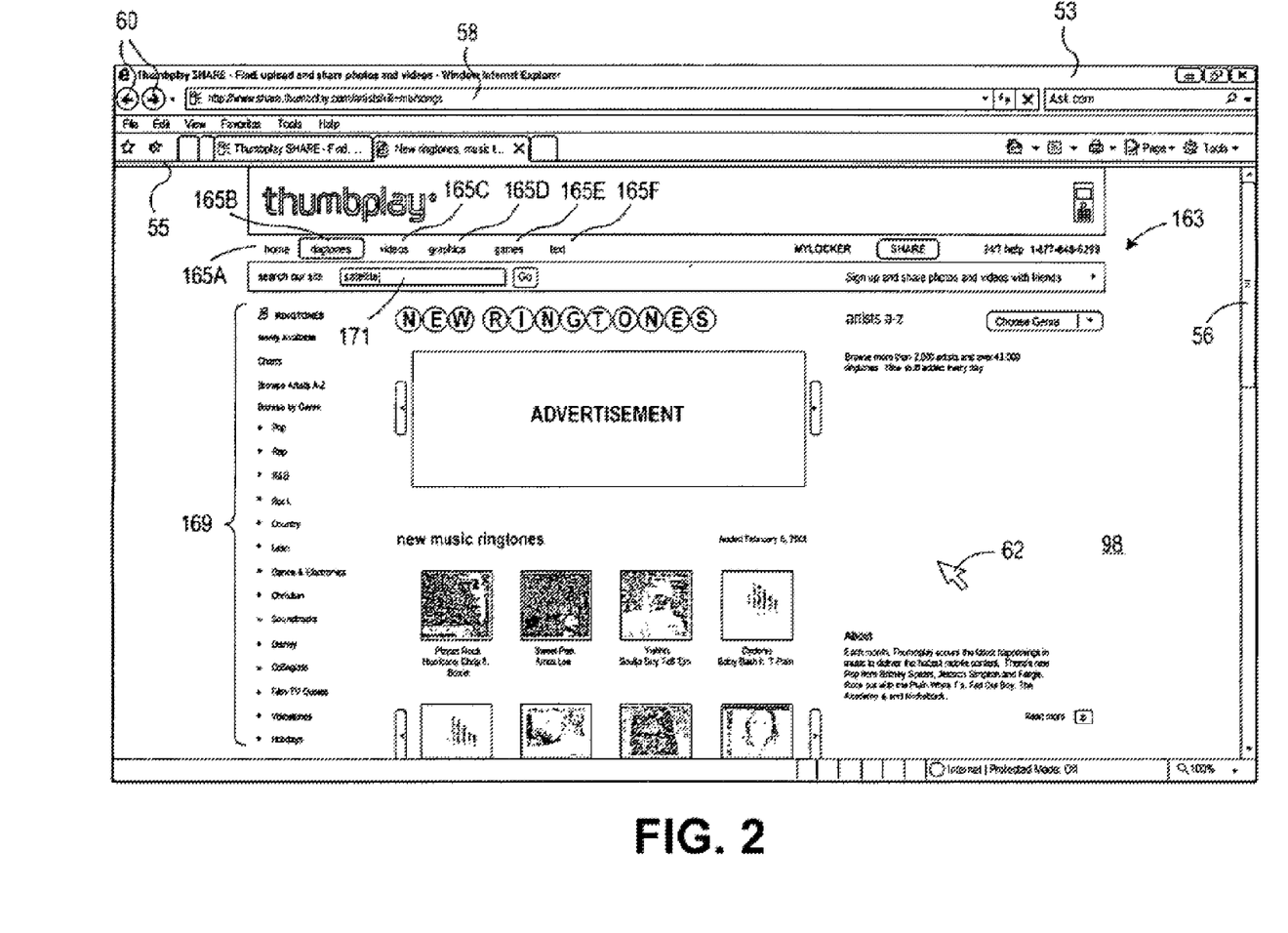
FIG. 2 is a screenshot of a browser view that displays a view of a website.

FIG. 2 illustrates a home page 163 within a browser view 53 at the user computer system 24, 26, or 28 in FIG. 1. The browser view 53 forms part of an Internet browser application such as Internet Explorer.®, Netscape.®, or Firefox.®. The browser view 53 includes a viewing pane 55 within which the home page 163 is displayed. The browser view 53 also includes a vertical scroll bar 56 that can be moved up or down to view portions of the home page 163 if the entire home page 163 does not fit vertically within the viewing pane 55. The browser view 53 also has an address box 58 and back and forward buttons 60. A user can use a mouse to move a cursor 62 into the address box 58, and then depress a button on the mouse to select the address box 58. The user can then utilize a keyboard to enter text such as "http://www.thumbplay.com" in the address box 58, and can then depress an "enter" key on the keyboard to transmit a signal and a request for a page. The text within the address box 58 can also be automatically updated, for example when a user logs into the home page 163. The back and forward buttons 60 can be used to view earlier or subsequent pages.

The home page 163 is in a general area of the Web site 48 in FIG. 1. The home page 163 includes tabs 165A to 165F that provide links to other pages of the general area. In the home page 163, the tab 165B is highlighted, indicating that the home page 163 is in a portion of the general area relating to ringtones.

The home page 163 is typically displayed at one of the user computer systems 24, 26, or 28 in FIG. 1, and provides the user computer systems 24, 26, or 28 access to ringtones through a browse menu 169 or by entering text in a search box 171. Text can, for example, be entered in the search box 171, and an acquiring user can then either select a "go" button 172 or hit "enter" on a keyboard to cause transmission of a signal from the user computer systems 24, 26, or 28 over the internet 30 to the Web site 48 in FIG. 1. The signal includes an address for the Web site 48, a query that is entered in the search box 171, and a return address for the user computer systems 24, 26, or 28. The query is used at the Web site 48 to extract one or more search results. A signal is then transmitted from the Web site 48 over the internet 30 to the user computer systems 24, 26, or 28, the signal including the search result or search results and an address corresponding to the return address received from the user computer 24, 26, or 28.

Not every signal is described in detail herein. One skilled in the art will appreciate that a signal is generated by and transmitted from one computer system and received and processed at another computer system, and will also appreciate what the contents of such a signal will be. One skilled in the art will also appreciate that a computerized step is typically carried out by a respective module of software code stored in memory of a computer. For example, a transmission step is typically carried out by a transmission module, a receiving step is carried out by a receiving module, a password generation step is carried out by a password generation module, etc. These modules are connected to one another so that a step carried out by one module can be followed by a step carried out by another module.

Figure 3:
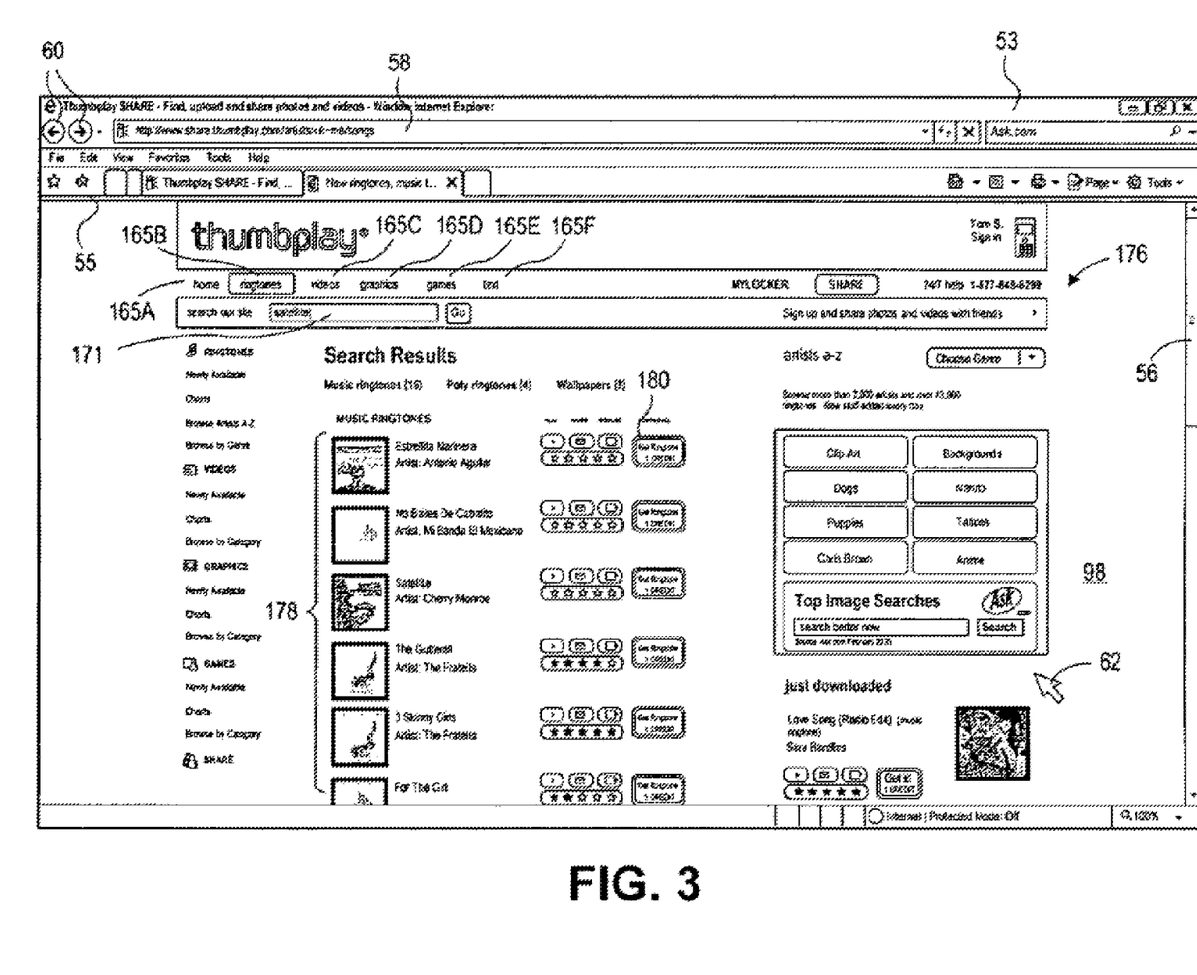
FIG. 3 is a view similar to FIG. 1, after a search has been conducted for media files in a database in FIG. 1.

FIG. 3 shows a view 176 that includes a download page with a plurality of search results 178 that are received at the user computer systems 24, 26, or 28 over the Internet 30 from the Web site 48. Each search result 178 includes a ringtone name, an artist name, and a ringtone download button 180, among other things.

Figure 4:
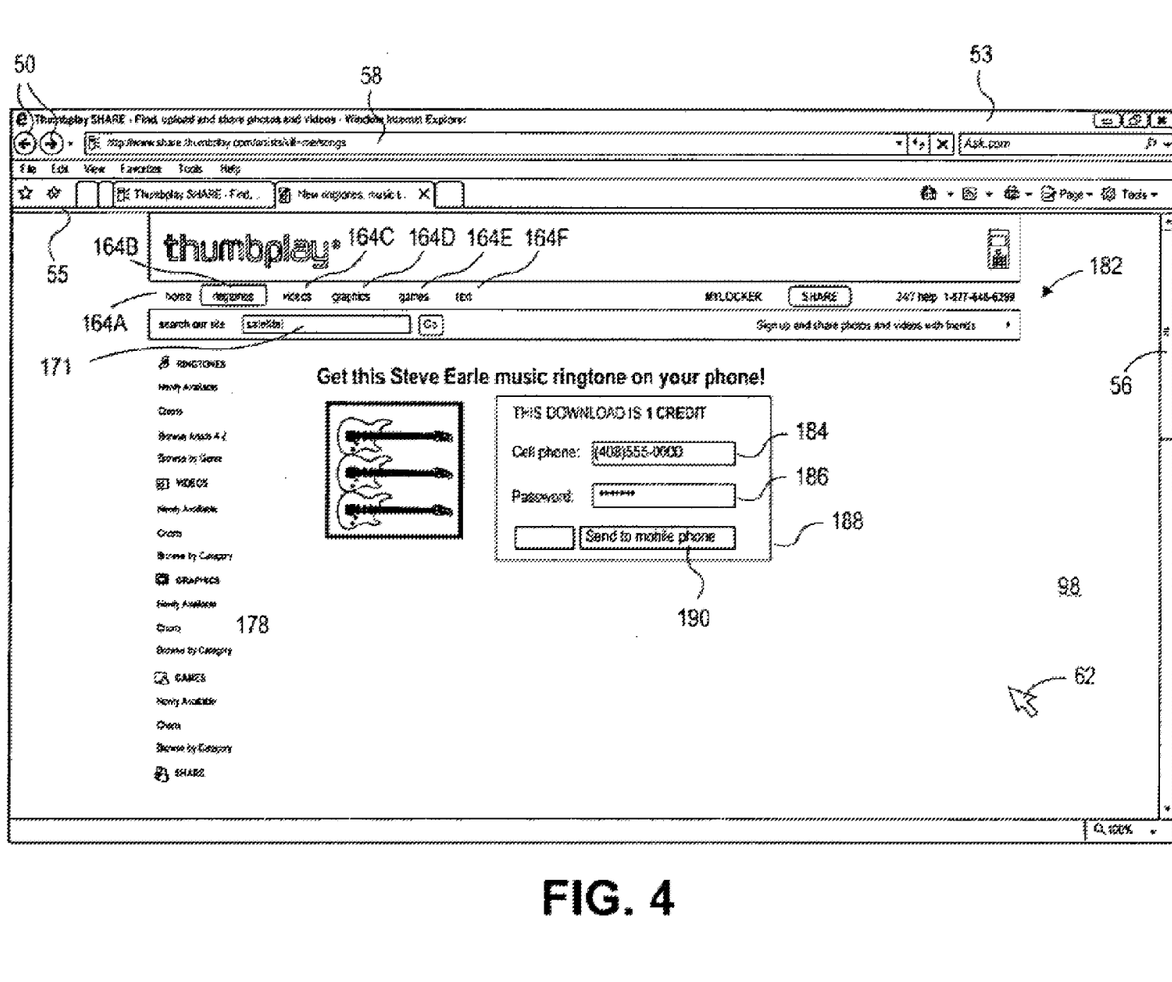
FIG. 4 is a view similar to FIG. 3, wherein registration and login information are completed and an instruction is sent to a server computer system to transmit a media file to a user mobile device.

FIG. 4 shows a view 182 that is displayed upon selection of one of the ringtone download buttons 180 in the view 176 of FIG. 3. A profile of the acquiring user computer system 24 is previously stored on the content delivery platform and content management system 46 of FIG. 1, including a mobile phone number 184 and a password 186. The view 182 includes the mobile phone number 184 and a password text box 188 for entering the password 186. The view 182 also has a "transmission" button 190. Upon selection of the "transmission" button 190, a signal is sent from the user computer system 24 over the Internet 30 to the Web site 48. The Web site 48 communicates with the content delivery platform and content management system 46, which uses the selected search result to access one of the ringtones on the media file server 42. The content delivery platform and content management system 46 then transmits a link corresponding to the accessed ringtone on the media file server 42 over the SMS/MMS network 40 to a user mobile device 32, 34, or 36 having the mobile phone number 184 in the view 182 of FIG. 4.

Figure 5:
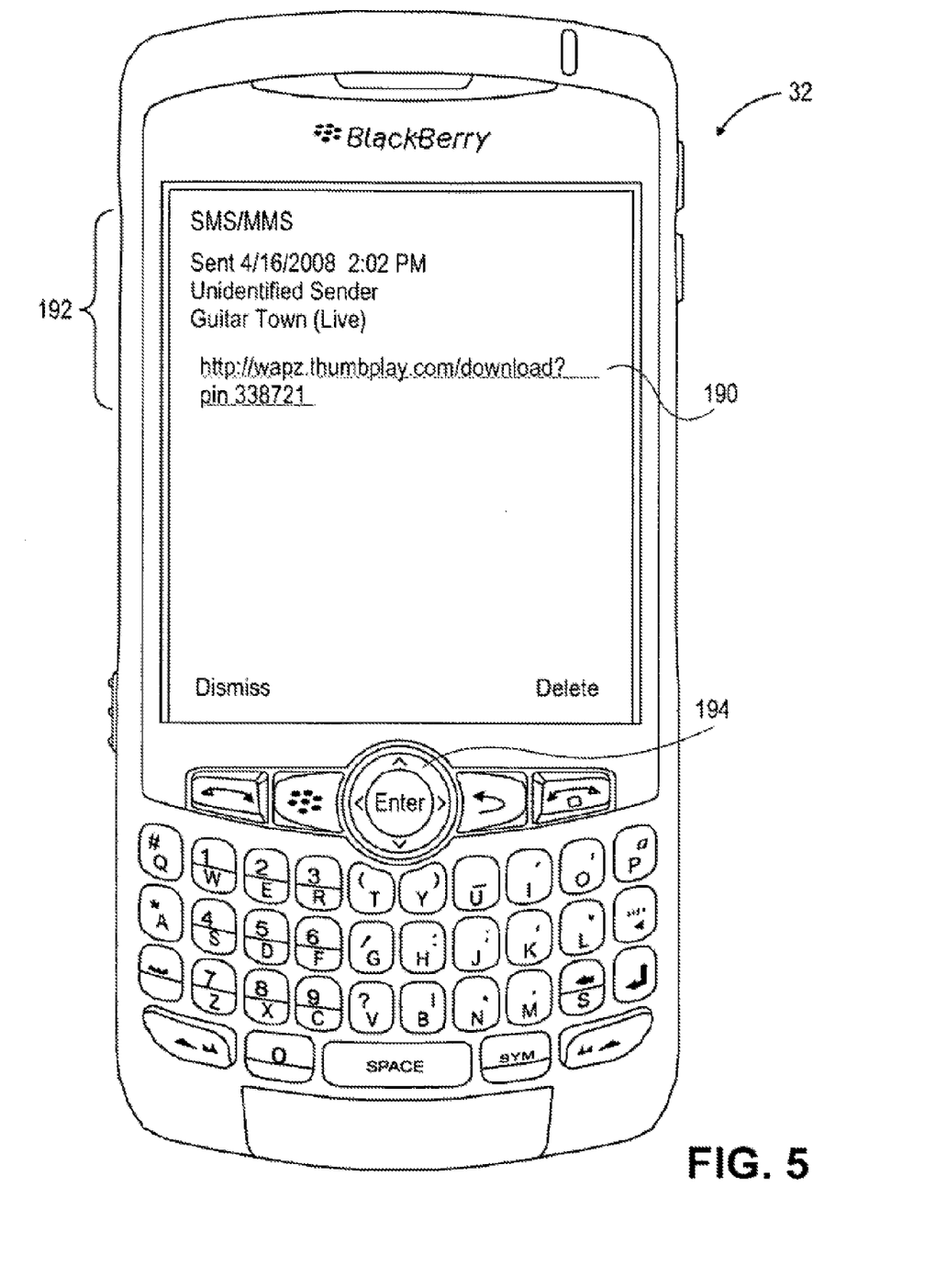
FIG. 5 is a front view of a user mobile device displaying an SMS message that is received by the user mobile device, the message including a link.

As shown in FIG. 5, the link 190 that is received at for example the user mobile device 32 comes in the form of an SMS message 192 that includes the link 190. An acquiring user can utilize "arrow" and "enter" keys 194 of the user mobile device 32 to select the link 190.

Figure 6:
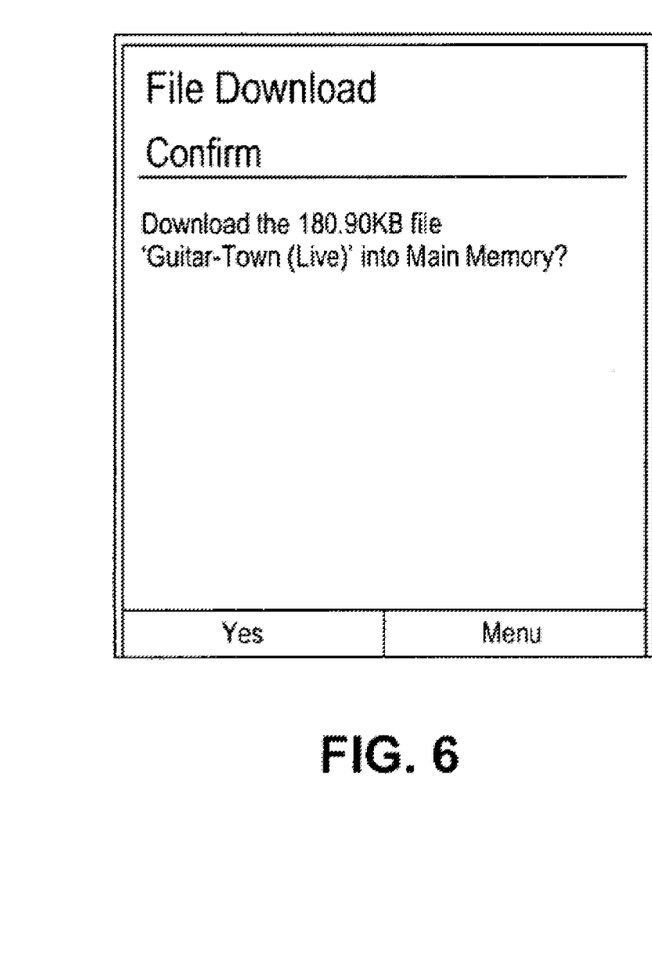
FIG. 6 displays a view on a WAP browser of the user mobile device to confirm downloading of a media file into memory of the user mobile device.
Figure 7:
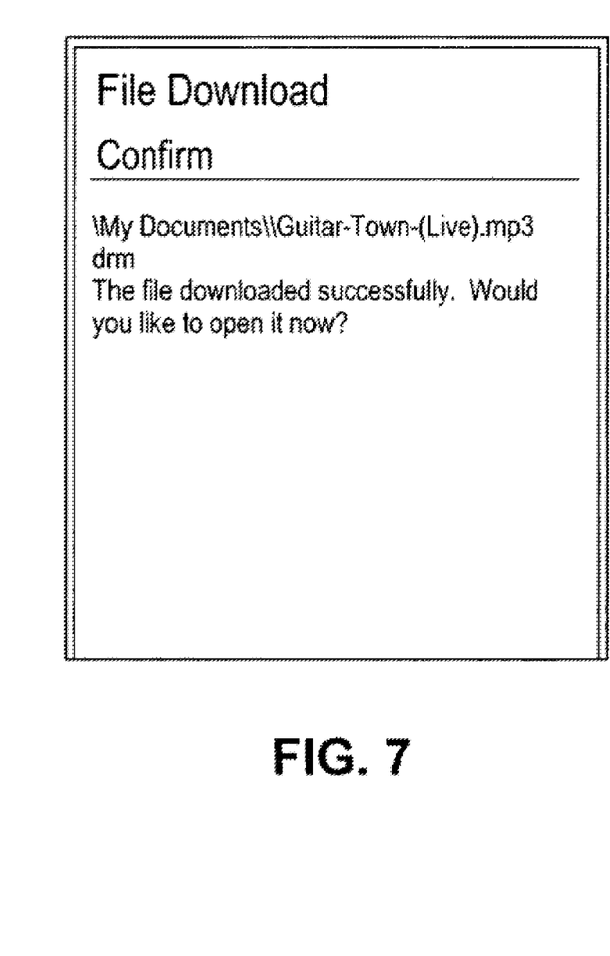
FIG. 7 is a view that is displayed on the user mobile device following successful downloading and saving of the media file.

Upon selection of the link 190 and confirmation of the download as shown in FIG. 6, the user mobile device 32 transmits a requesting signal over the WAP network 38 in FIG. 1 to the content delivery platform and content management system 46. The content delivery platform and content management system 46 then automatically transmits a copy of the selected ringtone (or other media file) from the media file server 42 over the WAP network 38 to the respective user mobile device 32. The respective user mobile device 32 then automatically stores the copy of the selected ringtone in memory. As shown in FIG. 7, the user mobile device 32 then displays a message that confirms that the file has been downloaded and stored in memory of the user mobile device 32.

Figure 8:
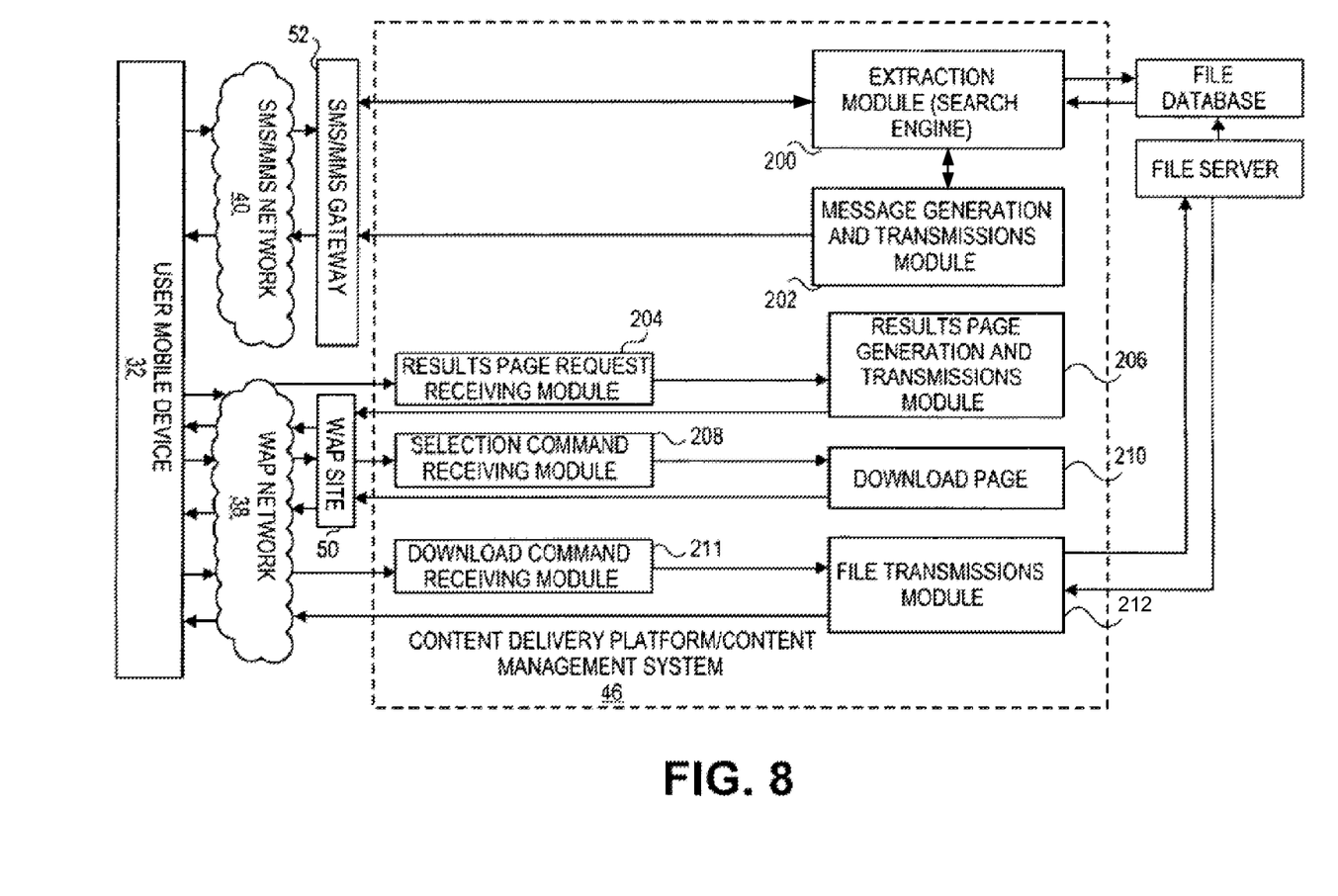
FIG. 8 is a block diagram illustrating components that are used primarily for processing a search request in a message from the user mobile device.

FIG. 8 illustrates components of the content delivery platform and content management system 46 that are used for responding to an SMS message with a search identifier "Get" that is received directly from for example the user mobile device 32 in FIG. 1. The components of the content delivery platform and content management system 46 shown in FIG. 8 provide a system that is different from and in addition to the system as hereinbefore described that utilizes the Website 48 in FIG. 1.

The content delivery platform and content management system 46 further includes a search engine, hereinafter referred to as an "extraction module" 200, a message generation and transmissions module 202, a results page request receiving module 204, a results page generation and transmissions module 206, a selection command receiving module 208, a download page 210, a download command receiving module 211 and a file transmissions module 212. The functioning of the system shown in FIG. 8 will now be described with reference to FIGS. 9 to 14 in conjunction with FIG. 8.

Figure 9:
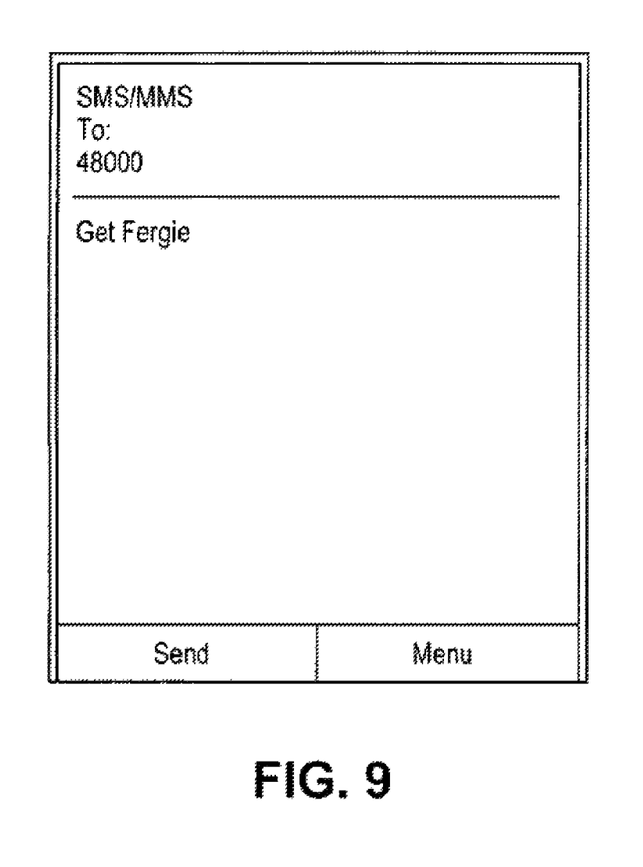
FIGS. 9 to 14 are views that are displayed on the user mobile device to illustrate the functioning of the system of FIG. 8.
Figure 10:
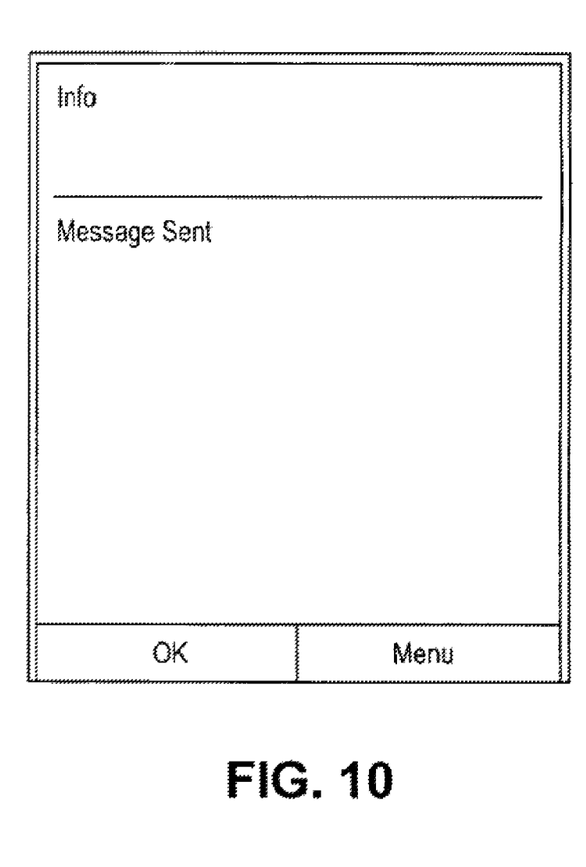

As shown in FIG. 9, the user of the user mobile device 32 prepares a message to an address 48000 with the text "Get Fergie" and then selects a "send" button to transmit the message. The message is transmitted from the user mobile device 32 over the SMS/MMS network 40 and is received by the SMS/MMS gateway 52. FIG. 10 shows a view that is displayed on the user mobile device 32 following transmission of the message.

SMS/MMS gateway 52 is connected to the extraction module 200. The extraction module 200 recognizes the text "Get" and the search query "Fergie" in the SMS message. The text "Get" serves as a search identifier. Upon detection of the search identifier "Get" by the extraction module 200, the extraction module 200 thus determines that the message includes a search identifier and then utilizes the search query "Fergie" to extract a plurality of search results from the file database 44.

Figure 11:
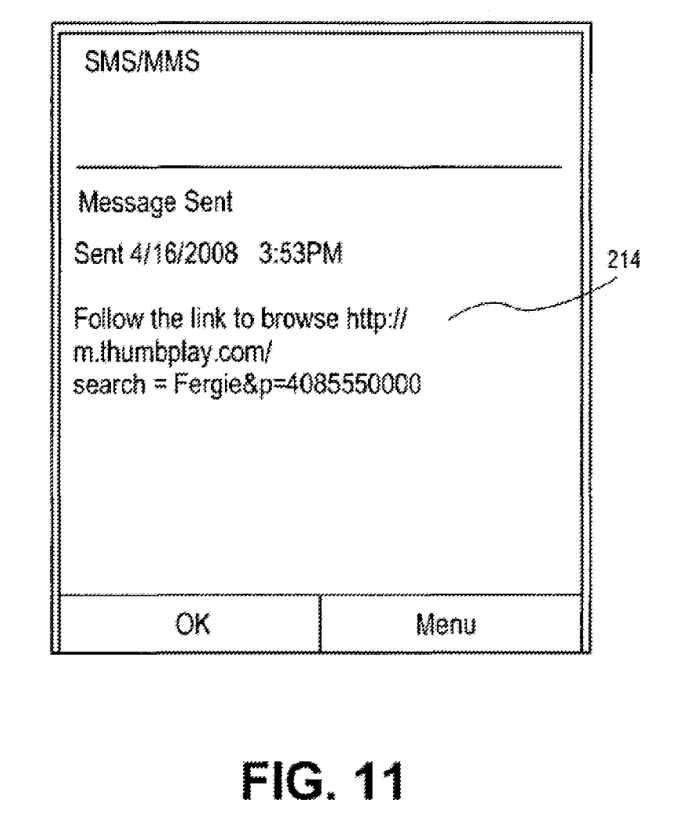

The message generation and transmissions module 202 is connected to the extraction module 200 and transmits a message through the SMS/MMS gateway 52 and the SMS/MMS network 40 to the user mobile device 32. If, as in the present example, the extraction module 200 has detected the search identifier "Get" in the SMS message of FIG. 9, the message that is transmitted by the message generation and transmissions module 202 as received by the user mobile device 32 and is shown in FIG. 11. The message includes a link 214 that can be selected by a user utilizing the "arrow" and "enter" keys of the user mobile device 32. If, on the other hand, the search identifier "Get" was not present in the text, a message is sent to the mobile user device 32 with text stating that the message from the user mobile device 32 was in error.

Figure 12A:
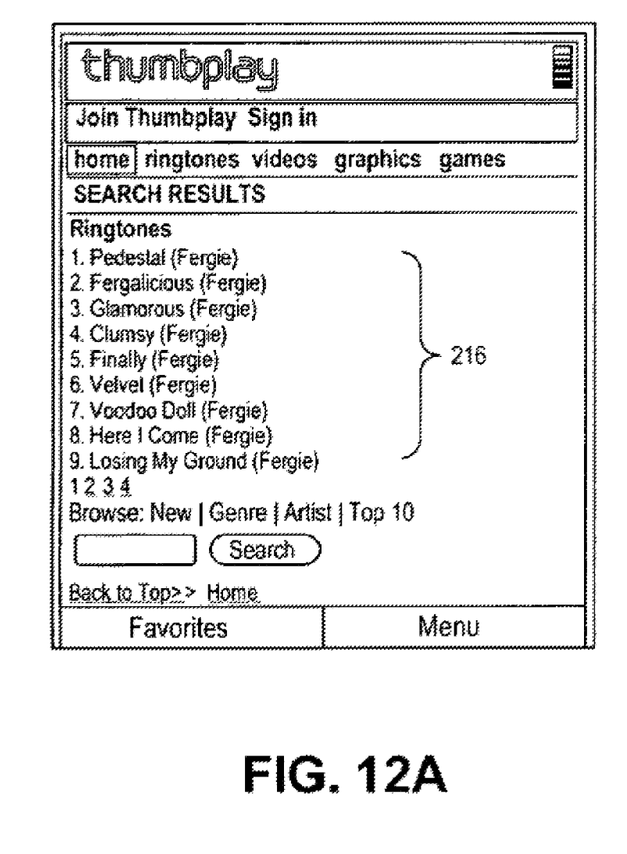

FIG. 12A shows a view of a WAP browser that automatically launches upon selection of the link 214 in FIG. 11. Upon selection of the link 214, a results page request command is transmitted by the user mobile device 32 over the WAP network 38 and is received by the results page request receiving module 204. The command includes the entire link 214. The link 214 includes the search request "Fergie" and a return address (the phone number) of the user mobile device 32. The results page generation and transmissions module 206 is connected to the results page request receiving module 204 and to the extraction module 200. The results page generation and transmissions module 206 generates a results page that includes the search results that are extracted by the extraction module 200 and transmits the results page via the WAP site 50 and the WAP network 38 to the user mobile device 32. FIG. 12A shows the results page and the search results 216 that are displayed by the WAP browser of the user mobile device 32.

Figure 12B:
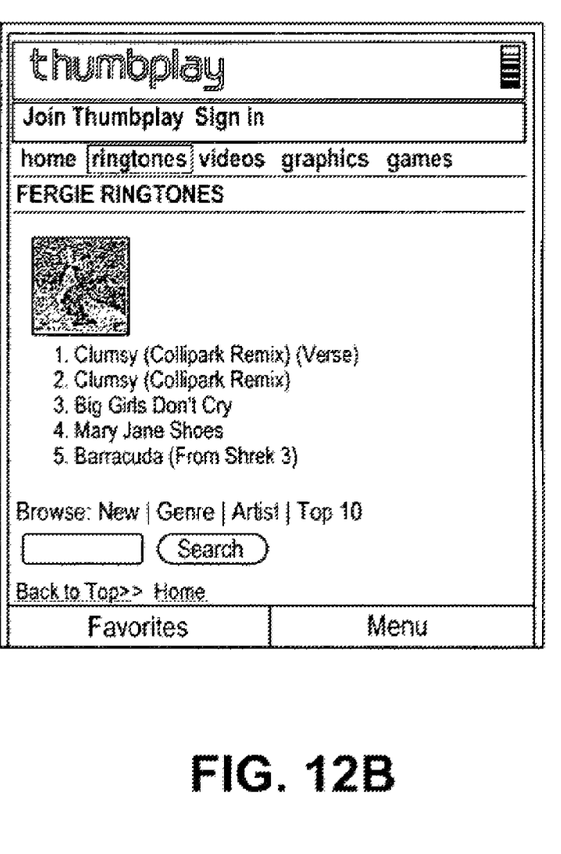

FIG. 12B shows an alternative where a WAP browser is directed to an artist-specific page. An artist-specific page is displayed when a one-to-one match can be made between the search query and the artist-specific page. A track-specific page can be displayed when a one-to-one match can be made between the query and the track. A results page such as in FIG. 12A is displayed when a one-to-one relationship cannot be made between the query and either an artist or a track. The results page thus displays results from more than one artist or track.

Figure 13:
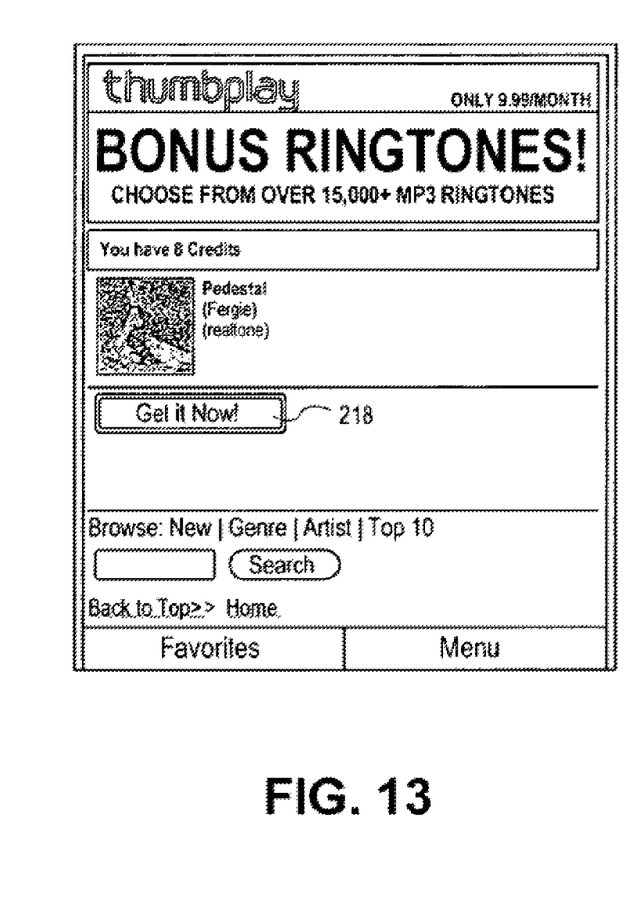

In the present example, the user selects the first search result "pedestal" to cause transmission of a selection command from the user mobile device 32 over the WAP network 38 and the WAP site 50. The selection command receiving module 208 is connected to the WAP site 50 and to the download page 210 so that the download page 210 is transmitted over the WAP site 50 and the WAP network 38 to the user mobile device 32. FIG. 13 shows a view of the download page 210 on the user mobile device 32. The download page 210 includes a "download" button 218. The buttons of the user mobile device 32 can be used to select the download button 218, which causes transmission of a download command from the user mobile device 32 over the WAP network 38.

Figure 14:
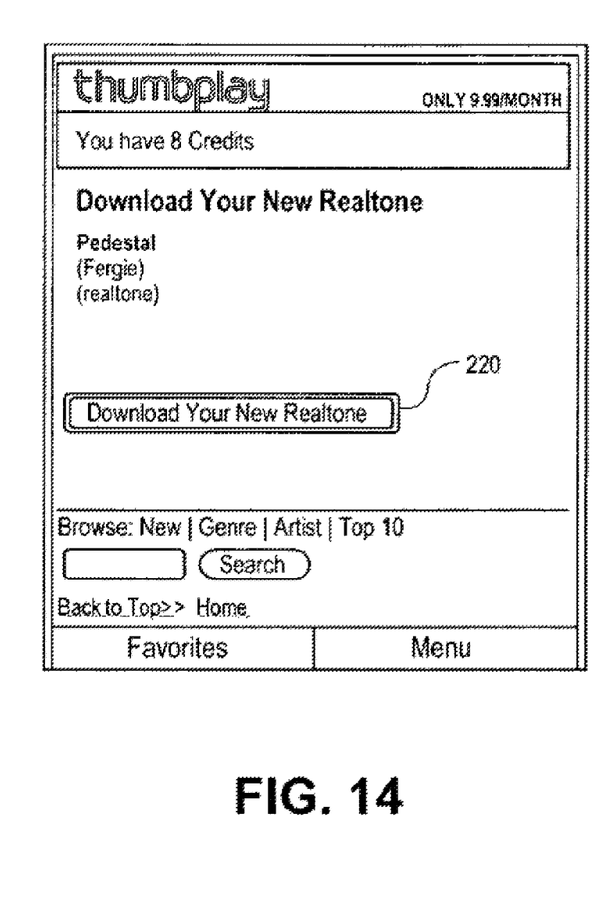

The download command receiving module 211 is connected to the WAP network 38 so as to receive the download command. The file transmissions module 212 is connected to the file server 42 and to the download command receiving module 211. The download command includes the name of the particular file in the file server 42, i.e. the file corresponding to the entry "pedestal" in the file database 44. The file transmissions module 212 utilizes the name of the entry in the download command to extract the corresponding file from the file server 42, and then transmits the file over the WAP network 38 to the user mobile device 32. FIG. 14 shows a view that is displayed on the user mobile device 32 to confirm downloading of the respective file. Upon selection of a confirmation button 220, the file is downloaded and saved in memory of the user mobile device 32 as hereinbefore describe with reference to FIGS. 6 and 7.

It can also been seen that the SMS messaging capabilities of the user mobile device 32 can be used to transmit a request for a media file. There is thus no need to utilize the WAP browser on the user mobile device 32 to search for and request a media file or to use a Web browser on a personal computer to search for and request a media file.

Figure 15:
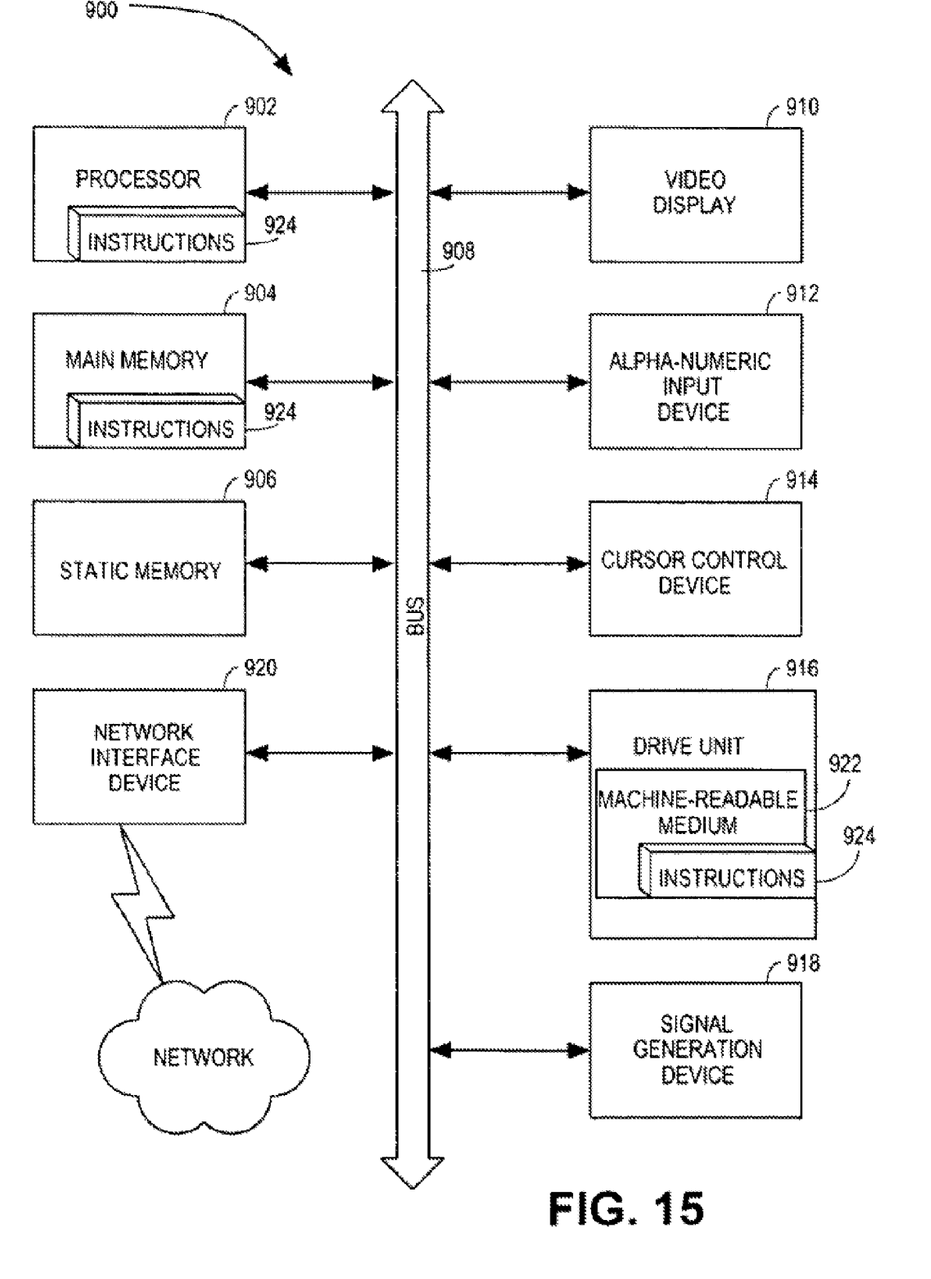
FIG. 15 is a block diagram of a machine in the form of a computer system that can be used as a computer or a mobile device in the systems of FIG. 1 or 8.

FIG. 15 shows a diagrammatic representation of a machine in the exemplary form of a computer system 900 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU), a graphics processing unit (GPU) or both), a main memory 904 (e.g., read only memory (ROM), flash memory, dynamic random access memory (DRAM) such as synchronous DRAM (SDRAM) or Rambus DRAM (RDRAM), etc.), and a static memory 906 (e.g., flash memory, static random access memory (SRAM), etc.), which communicate with each other via a bus 908.

The computer system 900 may further include a video display 910 (e.g., a liquid crystal display (LCD) or a cathode ray tube (CRT)). The computer system 900 also includes an alpha-numeric input device 912 (e.g., a keyboard), a cursor control device 914 (e.g., a mouse), a disk drive unit 916, a signal generation device 918 (e.g., a speaker), and a network interface device 920.

The disk drive unit 916 includes a machine-readable medium 922 on which is stored one or more sets of instructions 924 (e.g., software) embodying any one or more of the methodologies or functions described herein. The software may also reside, completely or at least partially, within the main memory 904 and/or within the processor 902 during execution thereof by the computer system 900, the main memory 904 and the processor 902 also constituting machine-readable media.

The software may further be transmitted or received over a network 928 via the network interface device 920.

While the machine-readable medium 924 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, optical and magnetic media, and carrier wave signals.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed is:

1. A method, executable by a computer, comprising:
   receiving a messaging service message, via a SMS/MMS gateway, at a server computer system from a user mobile device, wherein the messaging service message is directed to an address associated with an extraction module of the server computer system;

determining, at the extraction module, whether the messaging service message includes a search identifier;
responding to a determination that the messaging service message includes the search identifier by:
  determining a search term included in the messaging service message;
  extracting at least one search result of a plurality of search results based on the search term;
  transmitting a download link associated with the at least one search result for the search term;
  transmitting, to the user mobile device, a search result message including a page link for accessing a search results page including at least one search result selected based on the search term included in the messaging service message; and
  responding to receiving a download command from the user mobile device at the server computer system by transmitting, to the user mobile device, a file corresponding to the at least one search result, the download command is received at least in part due to a selection of the at least one search result via interaction with the search results page at the user mobile device.

2. The method of claim 1, further comprising:
transmitting a return address of the user mobile device to the user mobile device in the download link.

3. The method of claim 1, further comprising responding to receiving a download command including the download link from the user mobile device at the server computer system by transmitting a file to the user mobile device, the download command is received at least in part due to a selection of the download link at the user mobile device.

4. The method of claim 1, further comprising:
responding to receiving a results page request command from the user mobile device at the server computer system by transmitting the search results page to the user mobile device, the results page request command is received at least in part due to a selection of the page link at the user mobile device.

5. The method of claim 4, wherein:
the messaging service message is received over a Short Message Service (SMS) network; and
the search results page is transmitted over a Wide Application Protocol (WAP) network.

6. The method of claim 1 further comprising:
responding to a determination that the messaging service message does not include the search identifier by performing a second function.

7. The method of claim 6, wherein performing the second function comprises transmitting an error message to the user mobile device.

8. A computer system comprising:
a processor; and
a memory coupled to the processor, the memory operable to store a program of instructions for causing the processor to:
  receive a message from a user mobile device, via a SMS/MMS gateway, wherein message is directed to an address associated with an extraction module of the computer system;
  determine, at the extraction module, whether a search identifier is present in the message;
  respond to a determination that the search identifier is present in the message by:
    determining a search term included in the message;
    extracting at least one search result of a plurality of search results based on the search term;
    transmitting, to the user mobile device, a download link relating to the at least one search result for the search term;
    transmit a search result message including a page link for accessing a search results page including at least one search result selected based on the search term; and
    respond to receiving the download command from the user mobile device by transmitting the file to the user mobile device, the download command is received at least in part due to a selection of the at least one search result via the search results page at the user mobile device.

9. The computer system of claim 8, the download link includes a return address of the user mobile device.

10. The computer system of claim 9, the memory operable to store a program of instructions for causing the processor to:
respond to the determination that the search identifier is present in the message by extracting at least a portion of text included in the message as the search term; and
select a file from a data store holding a plurality of files and a plurality of entries corresponding to the plurality of files based upon a determination that the file corresponds to the search term.

11. The computer system of claim 10, the memory operable to store a program of instructions for causing the processor to:
respond to receiving a download command from the user mobile device by transmitting the file to the user mobile device, the download command is received at least in part due to a selection of the download link at the user mobile device.

12. The computer system of claim 8, the memory operable to store a program of instructions for causing the processor to:
respond to receiving a results page request command from the user mobile device by transmitting the search-results page to the user mobile device, the results page request command is received at least in part due to a selection of the page link at the user mobile device.

13. The computer system of claim 8 further comprising:
respond to a determination that the search identifier is not present in the message by transmitting an error message to the user mobile device.

14. A non-transitory machine-readable medium embodying computer code, the computer code comprising a program of instructions executable by a computer system, the program of instructions comprising:
at least one instruction to receive a short messaging service (SMS) message, via a SMS/MMS gateway, at a server computer system from a user mobile device, wherein the SMS message is directed to an address associated with an extraction module of the server computer system;
at least one instruction to determine, at the extraction module, whether a search identifier is present in the message;
at least one instruction to respond to a determination that the search identifier is present in the message by:
  determining a search term included in the messaging service message;
  extracting at least one search result of a plurality of search results based on the search term;
  transmitting a download link associated with the at least one search result for the search term to the user mobile device in a search result message;
at least one instruction to transmit a search result message including a page link for accessing a search results page including at least one search result selected based on the search term; and at least one instruction to respond to receiving the download command from the user mobile device by transmitting the file to the user mobile device, the download command is received at least in part due to a selection of the at least one search result via the search results page at the user mobile device.

15. The non-transitory machine-readable medium of claim 14, the search result message including a download link for downloading a file selected based on the search term included in the message.

16. The non-transitory machine-readable medium of claim 15, the program of instructions comprising:
- at least one instruction to identify the search term by extracting at least a portion of text included in the message; and
- at least one instruction to select the file from a data store holding a plurality of files and a plurality of entries corresponding to the files based upon a determination that the file corresponds to the search term.

17. The non-transitory machine-readable medium of claim 16, the program of instructions comprising:
- at least one instruction to respond to receiving a download command from the user mobile device by transmitting the file to the user mobile device, the download command is received at least in part due to a selection of the download link at the user mobile device.

18. The non-transitory machine-readable medium of claim 14, the program of instructions comprising:
- at least one instruction to respond to receiving a results page request command from the user mobile device by transmitting the search results page to the user mobile device, the results page request command is received at least in part due to a selection of the download link at the user mobile device.

19. The non-transitory machine-readable medium of claim 14, wherein:
the search result message includes a return address of the user mobile device.

20. The non-transitory machine-readable medium of claim 14, further comprising:
- at least one instruction to respond to a determination that the search identifier is not present in the message by transmitting an error message to the user mobile device.

* * * * *